Nov. 25, 1930.   H. A. MEYER   1,782,856
CONFECTION WRAPPER
Filed May 2, 1928
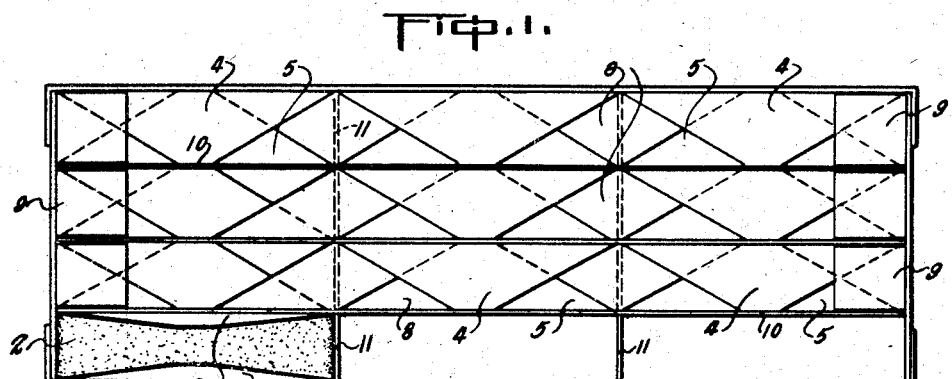
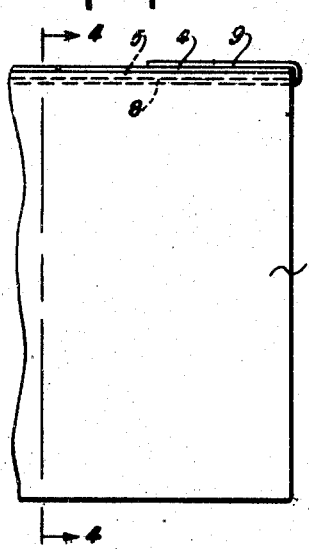
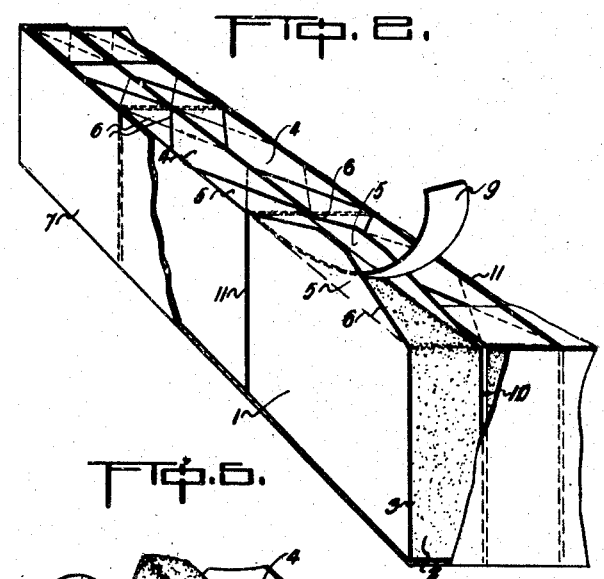
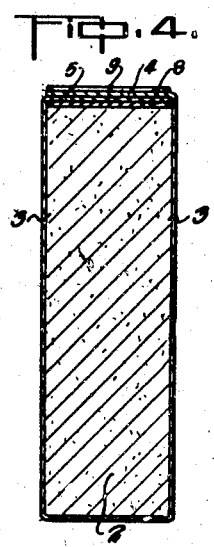
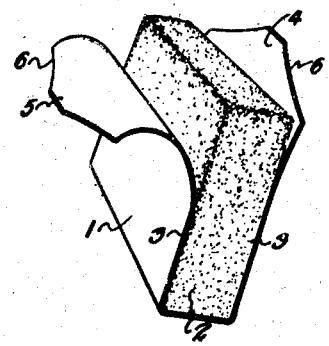
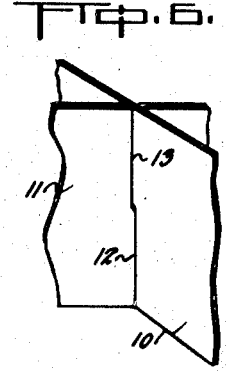
INVENTOR
HERBERT A. MEYER Patented Nov. 25, 1930

1,782,856

UNITED STATES PATENT OFFICE

HERBERT AUGUST MEYER, OF BUFFALO, NEW YORK

CONFECTION WRAPPER

Application filed May 2, 1928. Serial No. 274,629.

My invention relates to improvements in confection wrappers, particularly for use upon cakes of ice cream, and the object of the invention is to construct such a wrapper as will enable a plurality of wrapped cakes to be packed within any suitable container without coming into contact with each other, and a further object of my invention is to so form my wrappers that a cake of ice cream can be readily removed from the container by means of the wrapper without disturbing the other cakes contained therein.

Another object of my invention is to provide a wrapper which can be readily and quickly peeled from the contained cake of ice cream by means of the lifting flaps which are provided for removing the cake from the container, and another object of the invention is to provide cover strips which are adapted to extend along the tops of a plurality of aligned cakes in the receptacle, the removal of such strips lifting the wrapper flaps into a substantially upright position whereby they can be conveniently gripped when the cakes are being removed.

My invention consists of a cake wrapper constructed and arranged all as hereinafter more particularly described and illustrated in the accompanying drawing in which:

Fig. 1 is a plan view of a suitable container in which cakes of ice cream are positioned, several of such cakes being removed and one of the cakes being shown with the wrapper flaps lifted whereby it may be conveniently removed from the container.

Fig. 2 is a perspective view of a fragmentary portion of the container illustrated in Fig. 1, part of such container being broken away to disclose the ice cream cakes positioned therein.

Fig. 3 is an enlarged fragmentary view of an end portion of one of the wrapped cakes.

Fig. 4 is a vertical cross-sectional view taken through the line 4—4 Fig. 3.

Fig. 5 is a perspective view of an ice cream cake showing the wrapper partially removed therefrom.

Fig. 6 is a perspective view of a fragmentary portion of two of the intersecting partition strips which form cake receiving cells in the container.

Like characters of reference indicate corresponding parts of the different views.

Upon reference to Fig. 5 it will be readily seen that my wrapper sheet 1 is of unitary form and extends across the bottom of the cake 2 and upwardly along its sides 3, the upper ends of the sheet terminating in the flaps 4 and 5. These flaps can be of any desired form, but I have found it desirable to cut the corners to provide inclined edges 6 for lifting purposes as hereinafter more fully explained.

The container 7 can be of any desired dimension or shape, it, of course, being usual to so dimension the container that it receives without waste space a certain predetermined number of cakes. In the form illustrated in Fig. 1 the receptacle contains four rows of three cakes. Running along the tops of each of these rows, I position a strip 8, such strip lying upon the top of the cakes underneath the flaps 4 and 5, which are bent down on top of the strip. These strips are of greater length than the rows so that their ends 9 can be turned over on top of the flaps 4 and 5 of the end cakes in order to furnish a convenient gripping means whereby the strips may be readily removed.

The interior of the container 7 is of cellular form, being divided by a plurality of longitudinal and transverse vertical partition strips 10 and 11, the strips 10 are formed with upwardly extending slots 12, and the strips 11 with downwardly extending slots 13, such strips being locked together by means of the slots following standard egg carton practice, etc.

After the cakes have been formed in manufacture, the sheets 1 are wrapped therearound, the flaps remaining upright in the same manner as those of the wrapper of the corner cake shown in Figure 2. These upright flaps, of course, greatly facilitate the handling of the cakes in placing them in the container as they furnish a very convenient means for lowering them in place. When a row of cakes in end to end alignment is completed, the strip 8 is positioned in place wherein it extends along the tops of the cakes, its ends projecting beyond the ends of the outside cakes. The flaps 4 and 5 are then bent downwardly, the flaps 4 resting upon the top of the strip and the flaps 5 resting upon the top of the flaps 4. The ends 9 of the strip are then turned back upon themselves on top of the flaps in the manner clearly illustrated in Figs. 1, 3 and 4.

When the vendor desires to remove one or more cakes from the container, he lifts one end of the strip 8 by means of the turned back portion 9 and peels it off the row of cakes in the manner illustrated in Fig. 2. As the strip is peeled off, it of course lifts upwardly and raises the flaps 4 and 5 of each wrapping sheet into substantially upright positions as illustrated in Fig. 2. It will be readily seen that the substantially upright position of the flaps 4 and 5 upon each wrapper will provide a means whereby the flaps may be conveniently held by the vendor and the cakes readily lifted from the receptacle. When the cakes from which the strip has been removed have all been dispensed, the strip upon the next row is removed in a similar manner which places the flaps in a position whereby the cakes may be lifted.

By the provision of the cut corners forming the inclined edges 6 of the flaps, I have furnished a means whereby the vendor may readily insert the tip of his fore-finger between the flaps should they swing back and rest inner face to inner face after the strip 8 has been removed. It has been found that the cakes may be very readily removed from their container by placing the first finger between the flaps so that one flap extends between the first finger and the thumb and the other flap extends between the first finger and the second finger. The container in which the cakes are positioned may be either divided interiorly into cellular form as illustrated in the drawings, wherein a plurality of longitudinal and transverse strips 10 and 11 are provided, or if these strips are not used the cakes may be separated with paper strips extending between the abutting ends of each cross row, the strips 9 extending across the top of such paper strips in the same manner as they now extend across the tops of the transverse partition strips 11.

From the foregoing description, it will be apparent that I have constructed an extremely simple form of confection wrapper in which such wrappers can be very conveniently and quickly placed around the confection cakes during the packing process, and also have provided a means whereby individual cakes can be readily removed from the container when being vended. By the provision of the strips which lie along the tops of the aligned rows of cakes, I have furnished a protection for the tops of such cakes and also a means whereby the removal of such strips raises the flaps to permit the ready removal of the cakes. It is to be understood that although I have shown my cakes of a particular form that my wrapper could be used with many different shapes of cakes without departing from the spirit of my invention as set forth in the appended claims.

What I claim as my invention is:

1. A wrapping means for a plurality of aligned individual confections comprising sheets each adapted to extend around the sides and bottom of a confection, a unitary flexible strip adapted to lie along the tops of the confections, and flaps provided upon the upper edges of the sheet and extending over the top of the strip, such flaps being unsecured to the strip so that an upward movement of the strip will readily lift the flaps.

2. A confection wrapping means comprising a sheet adapted to extend around the sides and bottom of a confection, a flexible strip adapted to lie along the top of the confection, flaps provided upon the upper edges of the sheet and extending one over the other across the top of the strip, and a bent back portion formed upon the end of the strip and extending over the flaps.

3. A wrapping means for a plurality of individual confections comprising a plurality of longitudinal and transverse vertical partition strips forming a plurality of aligned confection receiving cells, a plurality of confection wrapping sheets each extending around the sides and bottom of a confection, a unitary flexible strip lying across the tops of the cells and resting upon the tops of the confections, and flaps extending from the upper edges of the sheets and extending over the top of the strip, such flaps being unsecured to the strip so that an upward movement of the strip will readily lift the flaps.

HERBERT AUGUST MEYER.